Sept. 29, 1953   J. C. ELGIN ET AL   2,653,349
RECLAIMING APPARATUS AND METHOD
Filed June 25, 1951   2 Sheets-Sheet 2

Inventors
JOSEPH C. ELGIN
EDWARD F. SVERDRUP

Curtis, Morris & Safford
Attorneys

Patented Sept. 29, 1953

2,653,349

UNITED STATES PATENT OFFICE 2,653,349

RECLAIMING APPARATUS AND METHOD

Joseph C. Elgin, Princeton, N. J., and Edward F. Sverdrup, Buffalo, N. Y., assignors to U. S. Rubber Reclaiming Company, Inc., Buffalo, N. Y.

Application June 25, 1951, Serial No. 233,446

21 Claims. (Cl. 18—12)

This invention relates to extrusion apparatus and to extrusion apparatus and methods for reclaiming rubber and like material by subjecting it to mechanical working while it is forced forward to an extrusion orifice.

This application is a continuation-in-part of our co-pending applications Serial No. 695,630, filed September 9, 1946, which is a continuation-in-part of our prior application Serial No. 524,064, filed February 26, 1944, and patented February 11, 1947, Patent No. 2,415,449; Serial No. 38,474, filed July 13, 1948; and Serial No. 209,287, filed February 3, 1951, which replaces as a continuation-in-part our prior applications Serial No. 39,476, filed July 19, 1948, and Serial No. 44,017, filed August 13, 1948, which applications have now been formally abandoned, but without abandoning applicants' claim to the subject matter.

Since the vulcanization of rubber involves the combining of molecules which are already of extraordinarily large size to form even larger molecules, the reclaiming of rubber should involve the breaking up of these larger molecules. To this end, mechanical working, heat, and chemical agents have all been employed; and best results have been obtained when all three were utilized. Indeed, it has proved advantageous to use all three from merely economic standpoints, since mechanical working generates heat, and agents not only assist in the reactions set up by the working and the heat, but also facilitate the operations themselves.

However, operations involving so many factors are exceedingly difficult to control, particularly since any improper balance of factors, any overheating, any variation of action in different parts of the material, any curtailing of action at a particular stage of operation, and any irregularity of action all contribute to improper results.

With the foregoing and other considerations in view, the present invention contemplates the provision of apparatus and methods whereby such effective control of reclaiming operations may be obtained that greatly improved reclaimed products may be produced.

The invention accordingly comprises the apparatus and methods exemplified in the foregoing detailed disclosure, the scope of the invention being indicated in the claims.

For a fuller understanding of the nature and objects of the invention, reference should be had to the following detailed description taken in connection with the accompanying drawings, in which:

Fig. 3 is a transverse sectional detail of an alternative form of construction at the discharge orifice; and Fig. 4 is a similar view of another alternative form.

Figure 1:
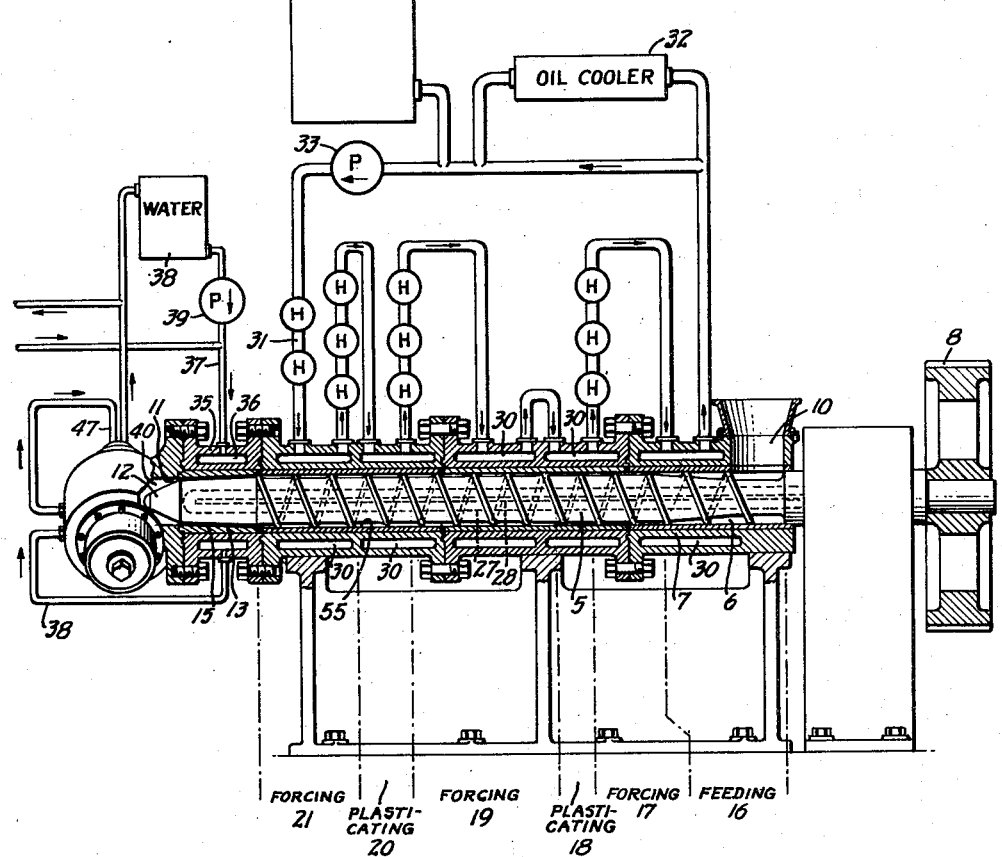
Figure 1 is a transverse vertical sectional view of a form of apparatus embodying the invention.

In the exemplified form of construction there is provided a working and forcing screw 5 rotating within a chamber 6 provided by a cylindrical casing 7. Suitable driving means such, for example, as shown at 8 are provided for rotating the screw which is adapted to subject comminuted tire scrap and similar vulcanized material to mechanical working while forcing it from an inlet 10 to an outlet 11. In the present instance, the screw is formed with a smooth-surfaced frusto-conical end 12 rotating within an annulus 13 having a frusto-conical opening between which and the end 12 a restricted passageway 15 is provided. The screw varies thruout its length, comprising a feeding section 16 having a tapered stem to provide between the threads valleys which are relatively deep but of decreasing depth, an initial forcing section 17, a plasticizing section 18, and intermediate forcing section 19, a second plasticizing section 20, and a final forcing section 21. The threads in the feeding and forcing sections have relatively steep sides 22 and 22' running sharply outwardly to flat bearing surfaces 23. In the plasticating sections, the threads have relatively gradually sloping forward surfaces 24 merging with rounded bearing surfaces 25. The valleys thruout the said forcing and plasticating sections are relatively shallow, typical dimensions being given hereafter. The screw is hollow as indicated at 27 to permit a temperature control liquid to be flowed in thru a central pipe 28 and to flow back out past it. The casing 7 is formed with channels 30 for the flow of temperature control fluid such, for example, as oil, under pressure through piping 31 to cooler 32 and pump 33 back to channel 30. A casing portion 35 which extends about the cone is provided with channels 36 connected with a controlled-temperature water container 38 and a pump 39 in a closed circuit by piping 37 and other channels hereinafter to be described.

The outlet 11 leads into a passageway 40 which, in the present instance, leads to a discharge passageway 41 which extends angularly to the chamber 6. The passageway 41 is formed in a discharge head 42 between a hollow, generally cylindrical casing portion 43 and an interior hollow pin 45. The casing 43 is formed with a cooling channel 46 which is connected by the piping 37 in circuit with a water tank 38, a pump 39, and channel 36. A water-inlet conduit 47 and a water-outlet conduit 48 within the pin 45 are likewise connected in circuit by the piping 47.

Figure 2:
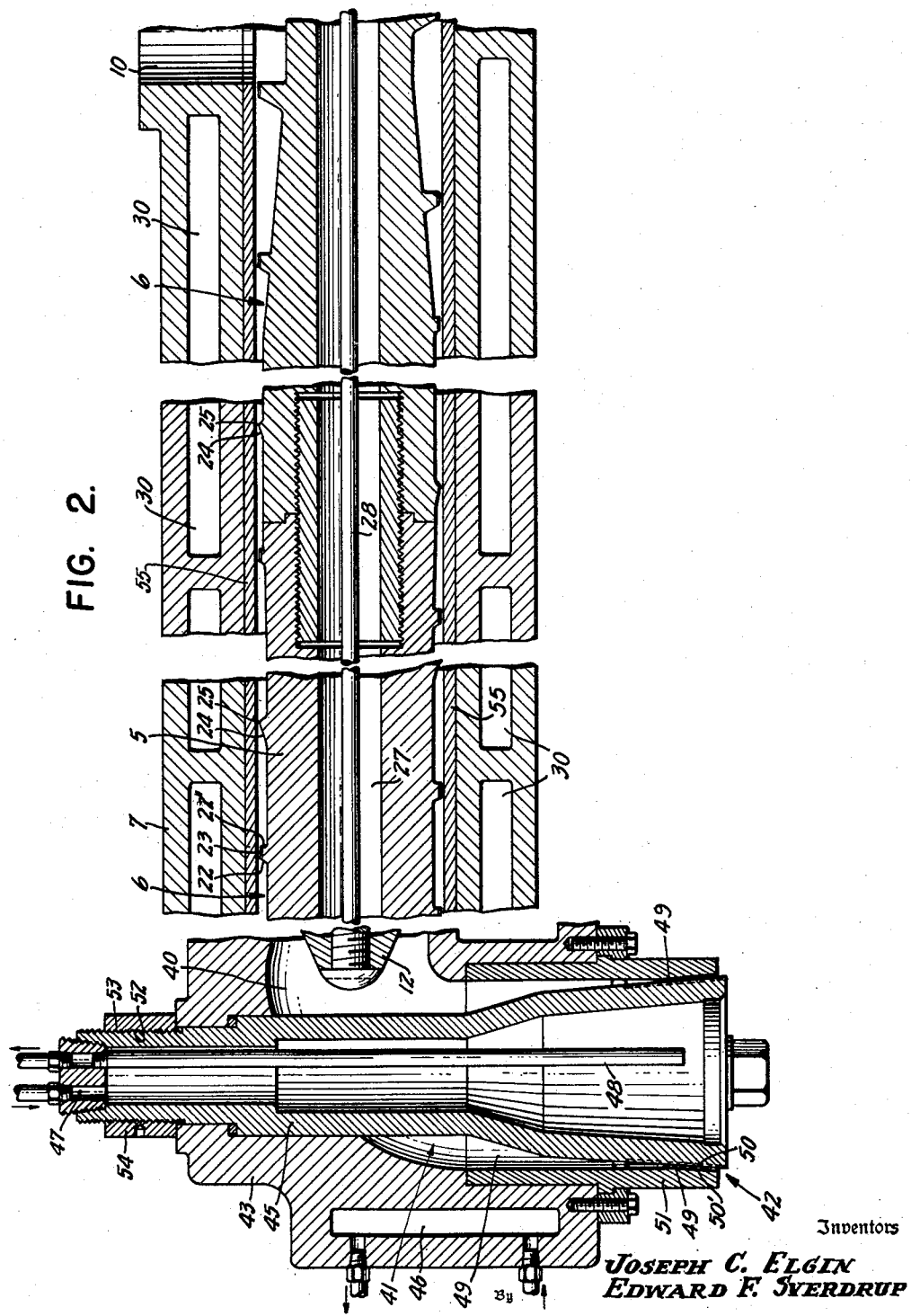
Fig. 2 is a transverse sectional view on an enlarged scale at a 30° angle with the horizontal along the lines 2—2 of Fig. 1, but showing only portions of the apparatus.

Pursuant to the invention, the passageway 41 includes an elongated restricted discharge portion 49 which, as exemplified in Fig. 2 is provided between a frusto-conical surface 50 at the end of the pin 45 and a frusto-conical interior surface 50' at the discharge portion of a sleeve 51 at the end of the casing 43. The pin is made longitudinally adjustable by means of screw threads 52 engaging interior threads 53 on an upper sleeve 54 supported by the casing 43. The wall of the chamber 6 is provided by a cylindrical liner 55 about an inch in thickness; and the length of the discharge passageway 41 may be considered as beginning at the outer surface of the cylindrical liner 55 and as extending to the end of the surface 50 or of the surface 50' whichever terminates first. Accordingly, by the adjustment of the position of the pin, the cross-sectional area of the most restricted portion of the discharge passageway may be readily varied.

If desired, there may be used an arrangement such as shown in Fig. 3 wherein the surfaces 50a and 50a' are cylindrical and parallel to the axis of a pin 45a so that the longitudinal extent of the restricted portion 49a of the passageway 41a may be varied without varying the cross-sectional area thereof; or, as shown in Fig. 4, a pin 45b may be cut away above the restricted portion 49b, as at 57, so that both the longitudinal extent and the cross-sectional area thereof may be varied, simultaneously.

We have found that in machines of the character illustrated, the effective length of the discharge head should be ten to forty inches, and preferably from fifteen to thirty inches; and that best results are obtained when the effective length of the head is about one-fourth to about one-twelfth the length of the working chamber. While the length of the restricted discharge channel, as between the surfaces 50 and 50' is preferably adjustable, and should be varied depending on various considerations, it may be said, in general, that it should be not less than about two and one-half inches in most instances, and should preferably be about four inches. In general, the length of this channel should be not over about eight inches.

We have also found that it is of importance in machines of the character illustrated that there be provided beyond the plasticizing chamber a discharge passageway of considerable length, and that this length be dependent on the capacity of the plasticizing chamber. Since this capacity is dependent to considerable extent on the length and/or effective cross-sectional area of the chamber, we have determined certain dimensions of the discharge head and certain proportions which the effective length of the discharge head should bear to the length of the chamber and to the normal cross-sectional area for flow past the screw stem, respectively.

In determining the normal effective cross-sectional area in the chamber, the calculation is based on the deepest of the screw valleys, ignoring, however, the feeding sections of the screw where the valleys are, pursuant to our invention, made especially deep, and ignoring also any unusual or irregularly deep valleys located along the screw. In determining the effective length of the head, any angular portion of the passageway utilized in connecting the chamber to a discharge passageway extending in a different direction is ignored, and the effective length figured as the shortest distance from the discharge end of the passageway in the head to the nearest point in line with the chamber.

In the table below, ratios of length (in inches) of the discharge head to the normal cross-sectional area (in square feet) are given:

Table 1

| Machine | Chamber Diameter | Thread Depth of Effective Portion of Screw (A) | Normal Cross-sectional Area Past the Stem of the Screw in Square Feet (B) | Length of Head Beyond Chamber (L) | Ratio of L to B |
| --- | --- | --- | --- | --- | --- |
|  | Inches | Inches |  | Inches |  |
| P | 3 | 5/16 | 0.0183 | 2.75 | 150 |
| Q | 6 | 15/32 | 0.057 | 9.5 | 164 |
| R | 12 | 1/2 | 0.126 | 16 | 127 |
| Figs. 1 and 2 | 12 | 3/8 | 0.122 | 19.5 | 160 |

A machine (S) similar to that of Figs. 1 and 2 but having a head-length of only 10.75 gave results which, relatively, were markedly unsatisfactory.

In general it may be said that, for a properly designed machine, the ratio of Table 1 should yield a figure above about 125, and, preferably, between about 140 and about 180.

We have also found that the average area (in square inches) along the effective length of the discharge passageway (in the head) should bear a particular relationship to the flow thru the chamber (in pounds per hour); and in the following table there are listed determinations thereof:

Table 2

| Machine | Chamber Diameter | Average Annular Area (C) of Discharge Passageway | Flow in Pounds Per Hour (E) | Ratio of E to C |
| --- | --- | --- | --- | --- |
|  | Inches | Sq. in. |  |  |
| P | 3 | 0.93 | 60 | 64 |
| Q | 6 | 4.50 | 300 | 67 |
| T | 12 | 30.7 | 1,500 | 48 |
| Figs. 1 and 2 | 12 | 26.50 | 1,500 | 58 |

Results in the above operation illustrated for machine "T," while better than with machines wherein the ratio is lower, were markedly inferior to those obtained with the other three operations illustrated. It may be said, in general, that while effective results may be obtained when the ratio of Table 2 above is between about 40 to about 80, outstanding results different in kind are obtained when the ratio is kept within the range of about 50 to about 70.

We have also found that best results are obtained when the dividend of the average cross-sectional area (in square inches) in that portion of the discharge passageway which is located beyond the nearest side of the chamber over the normal effective cross-sectional area (in square feet) in the chamber bears a ratio to the length (in inches) of the chamber of not over two, and preferably between one and two. Typical ratios are given in the table below:

Table 3

| Machine | Chamber Diameter | Average Annular Area (C) of Discharge Passageway, Square Inches | Normal Cross-sectional Area Past the Stem of the Screw in Square Feet | Length of Chamber (F) | Ratio of $\frac{C}{L}$ to F |
|---|---|---|---|---|---|
| | Inches | | | Inches | |
| P | 3 | 0.93 | 0.0183 | 27 | 1.88 |
| Q | 6 | 4.50 | 0.057 | 60 | 1.32 |
| Figs 1 and 2 | 12 | 26.50 | 0.122 | 120 | 1.81 |

It will be noted that the exemplified construction includes both the restricted channel portion (between the walls 50 and 50') and the wider portion extending from this restricted portion to the nearest point in line with the chamber 6. We have found that arrangements wherein there is a particular relationship between the capacity of these portions give excellent results and that this relationship is effectively expressed by the ratio of the average area of the restricted channel to the average area (C) along the effective length of the passageway (L). The latter may be effectively obtained by computing the areas periodically (as every one-half inch) along the shortest distance between a point in line with the chamber and the end of the restricted channel, and summing the individual increments.

Table 4

| Machine | Chamber Diameter, Inches | Most Restricted Area at Minimum Pin Adjustment in Square Inches (G) | Most Restricted Area at Maximum Pin Adjustment in Square Inches (H) | Ratio of G to D | Ratio of H to D |
|---|---|---|---|---|---|
| P | 3 | 0.126 | 0.55 | 0.135 | 0.59 |
| Q | 6 | 0.378 | 1.7 | 0.084 | 0.378 |
| Figs. 1 and 2 | 12 | 1.695 | 7.16 | 0.064 | 0.270 |

In general it may be said that the ratios, G/D and H/D of Table 4, should be in the range between .01 and 1., and preferably between .05 and .75.

We have also found that results tend to depend upon the ratio of the most restricted area in the discharge passageway to the normal cross-sectional area past the stem of the screw. Computations of such ratios are shown in the following table:

Table 5

| Machine | Chamber Diameter, Inches | Normal Cross-sectional Area Past the Stem of the Screw in Square Feet (B) | Ratio of G to B | Ratio of H to B |
|---|---|---|---|---|
| P | 3 | .0183 | 6.89 | 30.1 |
| Q | 6 | .057 | 6.63 | 29.8 |
| Figs. 1 and 2 | 12 | .122 | 13.88 | 58.9 |

In general it may be said that the ratios of Table 5 should vary from a low of 5 to a high of 65.

We have furthermore found that there is a ratio of effective length of the discharge passageway to the average area thereof expressed by $$\sum \frac{L}{D_1^2 - D_2^2}$$

where L is the effective length, $D_1$ is the outer diameter, and $D_2$ is the inner diameter of the discharge passageway. Typical determinations are expressed in the following table:

Table 6

| Machine | Chamber Diameter | Head Length (L) | $\sum \frac{L}{D_1^2 - D_2^2}$ |
|---|---|---|---|
| | Inches | Inches | |
| P | 3 | 2.75 | 3.2 |
| Q | 6 | 9.5 | 2.03 |
| U | 12 | 19.5 | 1.83 |
| Figs. 2 and 3 | 12 | 19.5 | 2.44 |

These should be contrasted with results on the following machine:

| | | | |
|---|---|---|---|
| S | | 12 | 10.75 | 0.5 |

Machine "S" gave results which were comparatively markedly inferior. In general it may be said that the ratio of Table 6 should be between 1 and 5.

The quality of results is also determined by the product of the ratio of Table 6 and the ratio of the volumetric displacement of the machine in cubic inches per minute to the square of the diameter of the chamber. Typical figures are indicated in the following table:

Table 7

| Machine | Chamber Diameter (K), Inches | Product of Ratios $\frac{M}{K^2} \sum \frac{L}{D_1^2 - D_2^2}$ | Vol. displacement of machine in cu. in. per min. (M) |
|---|---|---|---|
| P | 3 | 99 | 277 |
| Q | 6 | 72 | 1,268 |
| U | 12 | 57 | 4,430 |
| Figs. 2 and 3 | 12 | 75 | 4,430 |
| S | 12 | 15 | 4,430 |

It will be seen that the results for the inferior machine "S" are markedly out of line with the other results. In general it may be said that the ratio product of Table 7 should run between 30 and 150.

When two readings of the rate of flow in pounds per hour are substituted for the volumetric displacement of the machine in cubic inches per minute in the product of ratios of Table 7, significant results are likewise obtained as shown in the following table:

Table 8

| Machine | Chamber Diameter (K), Inches | Flow in Pounds Per Hour (E) | Product of Ratios $\frac{E}{K^2} \sum \frac{L}{D_1^2 - D_2^2}$ | Flow in Pounds Per Hour (J) | Product of Ratios $\frac{J}{K^2} \sum \frac{L}{D_1^2 - D_2^2}$ |
|---|---|---|---|---|---|
| P | 3 | 60 | 21.3 | 70 | 25 |
| Q | 6 | 300 | 16.9 | 350 | 19.8 |
| U | 12 | 1,500 | 19.3 | 1,800 | 23 |
| Figs. 2 and 3 | 12 | 1,500 | 25.5 | 2,000 | 34 |
| | | | | 3,000 | 40.2 |
| S | 12 | 1,500 | 5.2 | 1,600 | 5.5 |

In general the ratio product of Table 8 should range from 10 to 50, effective results being obtained when the ratio is not less than about 10.

In general also it may be said that the cross-sectional area of the restricted discharge channel should not be greater than 10 square inches.

The screw shown in Figs. 1 and 2 has an external diameter of substantially 12″ and the following dimensions:

Root diameter:
    Section length 12″ (Feeding) (straight) 8½″
    Section length 16″ (Feeding) (tapering) 8½″ to 11⁵⁄₁₆″
    Section length 25¼″ (straight) 11⁵⁄₁₆″
    Section length 8¼″ (tapering) 11⁵⁄₁₆″ to 11″
    Section length 58½″ (straight) 11″

Total length 120″

Thread pitch:
    Section length 18″   Forcing thread 12″ pitch
    Section length 27″   Forcing thread 8″ pitch
    Section length 8¼″   Plasticating thread 8″ pitch
    Section length 30¾″   Forcing thread 8″ pitch
    Section length 14″   Plasticating thread 8″ pitch
    Section length 22″   Forcing thread 8″ pitch Total length 120″

For this there may be substituted in certain instances the following screw:

Root diameter:
    Section length 12″ (Feeding) (straight) 8½″
    Section length 41¼″ (Feeding) (tapering) 8½″ to 10 ¼″
    Section length 66¾″ (straight) 10¼″

Total length 120″

Thread pitch:
    Section length 18″   Forcing thread 12″ pitch
    Section length 54″   Forcing thread 8″ pitch
    Section length 12″   Plasticating thread 8″ pitch
    Section length 12″   Forcing thread 8″ pitch
    Section length 12″   Plasticating thread 8″ pitch
    Section length 12″   Forcing thread 8″ pitch Total length 120 or the following screw:

Root diameter:
    Section length 12″ (Feeding) (straight) 8½″
    Section length 33¼″ (Feeding) (tapering) 8½″ to 11″
    Section length 8¼″ (straight) 11″
    Section length 2″ (tapering) 11″ to 9½″
    Section length 26½″ (straight) 9½″
    Section length 2″ (tapering) 9½″ to 11″
    Section length 12″ (straight) 11″
    Section length 2″ (tapering) 11″ to 9½″
    Section length 22″ (straight) 9½″

Total length 120″

Thread pitch:
    Section length 18″   Forcing thread 12″ pitch
    Section length 27″   Forcing thread 8″ pitch
    Section length 8¼″   Plasticating thread 8″ pitch
    Section length 30¾″   Forcing thread 8″ pitch
    Section length 14″   Plasticating thread 8″ pitch
    Section length 22″   Forcing thread 8″ pitch Total length 120″

Best results are obtained by the use of screw means in a jacketed tubular vessel, as exemplified. The material is treated in an annular passageway between the screw and the vessel by repeated working over the thread of the screw. The jacket around the tubular vessel, or other heating chamber, is connected, as exemplified, to circulate a heat-exchange fluid so that heat is withdrawn from the zones where heat is generated and transferred to the zone in which the rubber is being heated to the treating temperature known to be effective for reclaiming the particular materials being treated. Advantageously the material is treated in intimate contact with a channel wall held within a temperature range from approximately 300° F. to approximately 500° F. during the active treatment, and with the apparatus of this invention the temperature of the stock during treatment is kept under close control. This heat exchange from and to the peripheral wall serves a further function in keeping the tackiness and adhesion on the cylindrical wall of the chamber greater than in the helical channels of the screw, so that the material will be driven forward and not merely rotated. Each part of the stock in turn, remains under such temperature conditions for substantially the same time, which for best results should be not substantially less than one minute nor substantially more than twenty minutes. Reduction of the amount of reclaiming agent below an optimum amount requires higher temperatures; whereas with the preferred devulcanizing agents, softeners, etc., lower temperatures and higher working speeds can be used. Too high temperature in the treating zone may result in shear in the stock in preference to uniform plastic working. Increasing the temperature above 400° F. adversely affects the tensile strength, but it does make a softer stock which permits high production rates. With vulcanized Hevea rubber, such, for example, as pre-war inner tube scrap, a most desirable temperature range is 380°–410° F.

Heating is direct and internal, due to the internal mechanical working. The energy input rate for the types of material given below is advantageously of the order of 1.0 to 0.1 horsepower hours per pound of rubber. It is an important advantage of this invention that during continuous production this power input remains substantially constant. The stock after it leaves the treating zone should be cooled substantially below the treating temperature.

The speed of operation may be varied to maintain the desired process time of through-passage. For example, there have been provided screws of three-inch diameter, six-inch diameter, or twelve-inch diameter, with respective speeds of 60 R. P. M., 40 R. P. M., and 20 R. P. M. Flow rates up to 500 pounds per hour and more have been obtained with a six-inch diameter screw at 40 R. P. M., and up to 2100 pounds per hour and more, using a twelve-inch diameter screw at 20 R. P. M.

Other screws which have been utilized in various of the machines disclosed in said copending applications have the following arrangements:

| Screw diameter........inches.. | 3 | 3 | 6 | 12 |
|---|---|---|---|---|
| | Lengths | | | |
| Feed: | | | | |
|   Taper of 1st Forcing Section...do.... | 4 | 5 | 8 | 16 |
|   1st Forcing Section..............do.... | 6 | 7½ | 14 | 28 |
|   1st Plasticating Section.........do.... | 6 | 6 | 13½ | 25¼ |
|   2nd Forcing Section..............do.... | 4 | 4 | 10 | 18¾ |
|   2nd Plasticating Section.........do.... | 6 | 6 | 13½ | 26 |
|   3rd Forcing Section..............do.... | 5 | 3½ | 11⅞ | 22 |
| Valley depth in: | | | | |
|   1st Forcing Section..............do.... | ⅝ | ½ | ⅝ | ¾ |
|   1st Plasticating.................do.... | ⁹⁄₃₂ | ³⁄₃₂ | ⁹⁄₃₂ | ⁵⁄₁₆ |
|   2nd Forcing......................do.... | ⁵⁄₁₆ | ³⁄₁₆ | ½ | ½ |
|   2nd Plasticating.................do.... | ⁹⁄₃₂ | 1¹⁄₃₂ | 1⁵⁄₃₂ | 1⁵⁄₃₂ |
|   3rd Forcing......................do.... | ⁵⁄₁₆ | ⅜ | ½ | ½ |

In this specification and the accompanying drawings we have set forth certain embodiments and specific examples of operation which may be carried out by the invention and have suggested various modifications and alternatives. It should, however, be understood that these are not intended to be exhaustive or limiting of the invention, but on the contrary are given with a view to enabling others not only to practice the invention, but so fully to understand it and the principles thereof that they will be enabled to modify and adapt these examples and to embody the invention in many forms, each as may be best suited to the conditions of a particular use.

We claim:

1. Extrusion apparatus comprising a chamber having an inlet and an outlet, rotary means within said chamber for subjecting material therein to mechanical working while forcing it through said chamber toward said outlet, and a discharge head beyond said outlet and providing an elongated restricted discharge annulus, the inner walls of said annulus being formed by an adjustable pin with sloping sides and the outer walls being on a member provided with sides sloping in the same direction but of less extent, enabling the extent of said restrictions and the length of the restricted annulus to be varied.

2. Extrusion apparatus comprising, a rotary propulsive member, a chamber, screw means on said rotary member in said chamber for working material therein and advancing it therethru, and discharge means beyond said rotary member and having a length of from about one-twelfth to about one-fourth of the effective length of said chamber.

3. Extrusion apparatus comprising, a rotary propulsive member, a chamber, screw means on said rotary member in said chamber for working material therein and advancing it therethru, and discharge means beyond said rotary member having an effective length of from ten to forty inches.

4. Extrusion apparatus comprising, a rotary propulsive member, a chamber, screw means on said rotary member in said chamber for working material therein and advancing it therethru, and discharge means beyond said rotary member and including a restricted annular discharge channel having parallel inner and outer walls and having a length of not less than about two and one-half inches.

5. Extrusion apparatus comprising, a rotary propulsive member, a chamber, screw means on said rotary member in said chamber for working material therein and advancing it therethru, and discharge means beyond said rotary member and including a restricted annular discharge channel having parallel inner and outer walls and having a length in the neighborhood of four inches.

6. Extrusion apparatus comprising, a rotary propulsive member, a chamber, screw means on said rotary member for working material in said chamber and advancing it therethru, discharge means extending from rotary member to a discharge orifice, the ratio of the shortest distance (in inches) from said rotary means to said orifice over the normal effective cross-sectional area (in square feet) in the chamber being greater than about 125.

7. Apparatus as set forth in claim 6 wherein the distance from the rotary means to the discharge orifice is from about one-twelfth to about one-fourth the effective length of said chamber.

8. Extrusion apparatus comprising a chamber, screw means in said chamber for advancing material therethru and subjecting it to mechanical working therein, said screw comprising a feeding section with relatively deep valleys which tapers off to an operating section comprising a multiplicity of non-tapering relatively shallow valleys, discharge means beyond said screw means and including a discharge head extending at an angle to said chamber, the effective length of that portion of the discharge head which is located beyond one side of said chamber being such that the ratio of the length in inches over the cross-sectional area of the screw valleys at their deepest normal point in said operating section is between about 140 and about 180.

9. Extrusion apparatus comprising, a rotary propulsive member, a chamber, screw means on said rotary member for working material in said chamber and advancing it therethru, discharge means extending from said rotary member to a discharge orifice, the ratio of the dividend of the average cross-sectional area (in square inches) of the discharge passageway over the length (in inches) of said discharge passageway beyond the chamber to the length (in inches) of the chamber being between one and two.

10. Extrusion apparatus comprising, a rotary propulsive member, a chamber, screw means on said rotary member for working material in said chamber and advancing it therethru, and an annular discharge passageway beyond said rotary member, the ratio of the length (in inches of the discharge passageway beyond said rotary member to the difference between the square of the average outer diameter (in inches) of the passageway portion and the square of the average inner diameter (in inches) of the passageway portion being between about one and about five.

11. Extrusion apparatus comprising a rotary propulsive member, a chamber, screw means on said rotary member and in said chamber for working material in the chamber and advancing it therethrough, and a discharge passageway beyond said rotary member wherein the formula $$\frac{M}{K^2}\sum \frac{L}{D_1^2 - D_2^2}$$

yields between about 30 and about 150, where M is the volumetric displacement of the machine in cubic inches per minute, K is the chamber diameter in inches, L is the length in inches of the discharge passageway, $D_1$ is the average outer diameter thereof in inches, and $D_2$ is the average inner diameter thereof in inches.

12. Extrusion apparatus comprising, a rotary propulsive member, a chamber, screw means on said rotary member in said chamber for working material therein and advancing it therethru, and discharge means beyond said rotary member and including a restricted discharge channel having a length of from about half an inch to about eight inches, and having a cross-sectional area the ratio of which to the average cross-sectional area along the effective length of the discharge means is from .05 to .75.

13. Apparatus as set forth in claim 12 wherein the restricted discharge channel is annular and the inner and outer walls thereof are parallel.

14. Extrusion apparatus comprising, a rotary propulsive member, a chamber, screw means on said rotary member in said chamber for working material therein and advancing it therethru, and discharge means beyond said rotary member and having an annular restricted discharge channel having a cross-sectional area not greater than ten square inches and having a length not less than about half an inch.

15. Apparatus as set forth in claim 14 wherein the channel surrounds a longitudinally adjustable pin, and the channel increases outwardly in inner and outer diameter.

16. Extrusion apparatus comprising a chamber having an inlet and an outlet, rotary means including screw means for working material in said chamber and advancing it therethru, a discharge head beyond said rotary means having therein a discharge passageway terminating in a restricted discharge channel, the ratio of the average area (in square inches) of said restricted channel to the average area (in square inches) along the effective length of said passageway being from .01 to 1.0.

17. Extrusion apparatus comprising a chamber having an inlet and an outlet, rotary means including screw means for working material in said chamber and advancing it therethru, a discharge head beyond said rotary means having therein a discharge passageway terminating in a restricted discharge channel, the ratio of the minimum area (in square inches) in the discharge passageway to the normal cross-sectional area (in square feet) past the stem of the screw is between 5 and 65, and wherein the length of the restricted portion of the discharge passageway is between 2½ and 8 inches.

18. A plasticizing screw for an extrusion chamber comprising a feeding end having relatively deep valleys of decreasing extent, and sections having working and forcing threads respectively, the threads in the latter section having relatively shallow valleys.

19. In the art of reclaiming rubber and like material the process which comprises working the material in a chamber while forcing it therethru to an outlet from which it passes into a discharge head having an elongated restricted discharge channel, that method which comprises maintaining a flow thru the chamber such that the ratio of the flow expressed in pounds per hour over the average cross-sectional area of the orifice is between about 40 and about 80.

20. In the art of reclaiming rubber and like material the process which comprises working the material in a chamber while forcing it therethru to an outlet from which it passes into a discharge head having an elongated restricted discharge channel, that method which comprises utilizing apparatus as set forth in claim 9 and maintaining a flow through the chamber such that the ratio of the flow expressed in pounds per hour over the average cross-sectional area (in square inches) of the orifice is between about 40 and about 80.

21. In the art of reclaiming rubber and like material the process which comprises working the material in a chamber while forcing it therethru to an outlet from which it passes into a discharge head free from working means and having an elongated restricted discharge channel, that method which comprises maintaining a flow (in pounds per hour) thru said chamber such that the product of the ratio thereof to the square of the diameter of the chamber (in inches) and the ratio of the length of the discharge passageway (in inches) to the difference between the square of the outer diameter (in inches) of the discharge passageway and the square of the inner diameter (in inches) of the discharge passageway is between about ten and about fifty.

JOSEPH C. ELGIN.
EDWARD F. SVERDRUP.

References Cited in the file of this patent

UNITED STATES PATENTS

| Number | Name | Date |
| --- | --- | --- |
| 793,895 | Monroe | July 4, 1905 |
| 1,248,963 | Webber | Dec. 4, 1917 |
| 1,581,486 | Johnson | Apr. 20, 1926 |
| 1,800,180 | Day | Apr. 7, 1931 |
| 2,384,521 | Andersen et al. | Sept. 11, 1945 |
| 2,407,503 | Magerkurth et al. | Sept. 10, 1946 |